Sept. 6, 1927.
S. J. CLULEE
1,641,156
EYEGLASS CONSTRUCTION
Filed Oct. 19, 1923
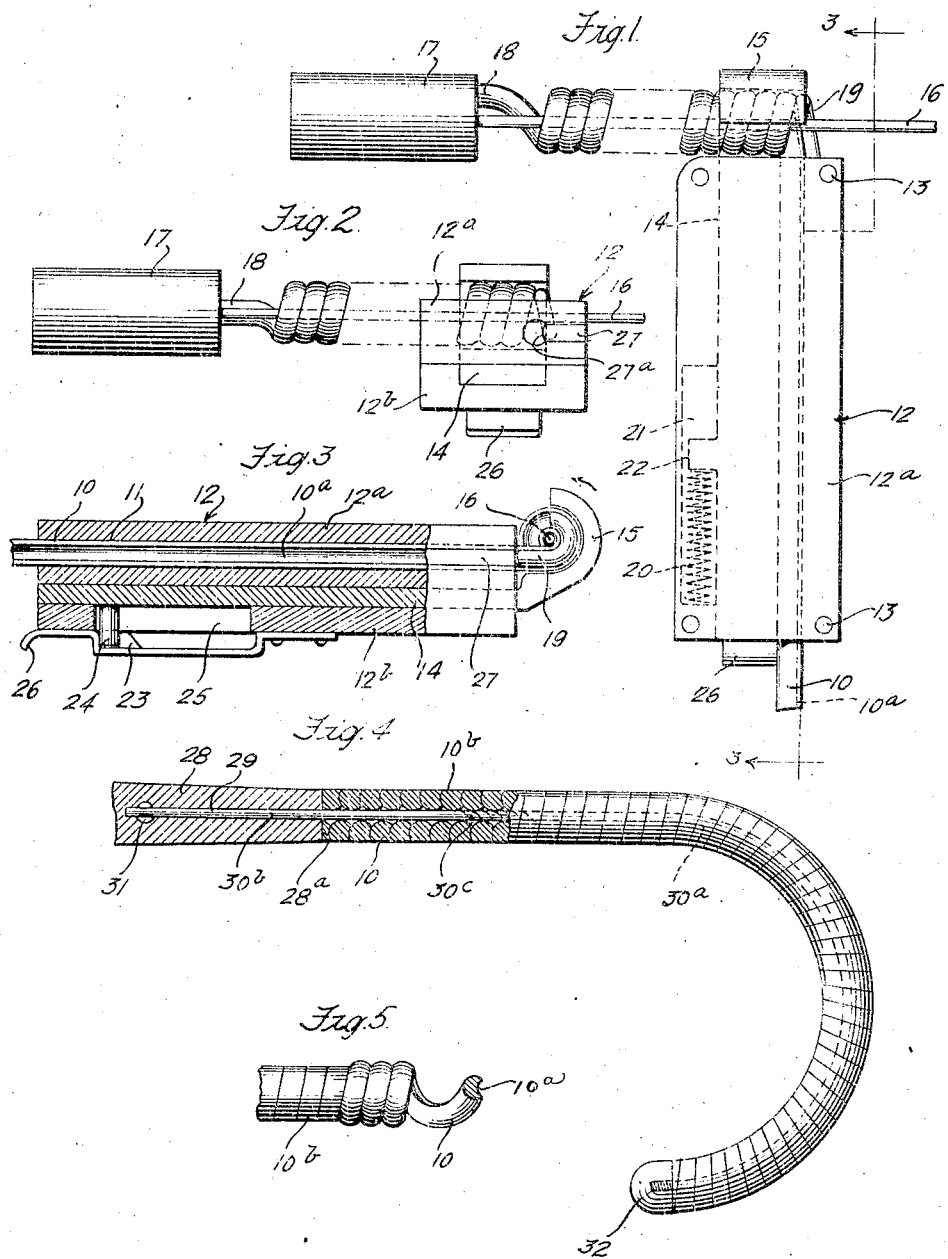
INVENTOR
Stephen J. Clulee
BY Robert S. Blair
ATTORNEY Patented Sept. 6, 1927.

1,641,156

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed October 19, 1923. Serial No. 669,567.

The invention relates to eyeglass construction and with regard to its more specific features to the construction of eyeglass temple bars.

One of the objects of the invention is to provide a construction of the above nature which is highly efficient and practical. Another object is to provide such a construction dependable in action and capable of meeting the requirements of practical use in a highly satisfactory manner. Another object is to provide such a construction neat in appearance and conducive to the comfort and convenience of the wearer. Another object is to provide a practical art for producing devices of the above nature which may be readily and conveniently carried on. Another object is to provide a practical and efficient apparatus for carrying on the above art. Other objects will be in part obvious or in part pointed out hereinafter. This application is a continuation in part of my application for eyeglass construction filed April 17, 1923, Serial No. 632,219.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing in which is shown one of the various possible embodiments of the several mechanical features of this invention:

Figure 1 is a plan view of an apparatus for making certain parts for eyeglass temple bars.

Figure 2 is an end elevation of the device shown in Figure 1.

Figure 3 is a section taken substantially along the line 3—3 of Figure 1.

Figure 4 shows the rear portion of a finished temple bar partly in section, and

Figure 5 is a fragmentary view of a part of the temple bar in partially completed form.

Similar reference characters refer to similar parts throughout the several views of the drawing.

Referring now to the drawing in detail there is shown in Figures 1, 2 and 3 an apparatus for spirally winding a strip or ribbon of celluloid to form therefrom a flexible member which might be termed a spirally wound celluloid cable for use in the construction of eyeglass temple bars. At this point it may be noted that the term "celluloid" is used in a broad sense throughout to comprehend various non-metallic substances of a nature similar to that of celluloid and adapted to form eyeglass frames or associated parts. The celluloid strip or ribbon 10 having been first formed and shaped to the desired cross-section is first softened to the desired degree by any suitable means such as treatment in a solvent solution and is then inserted into the end of the recess or passage 11 formed therefor through a supporting device 12. This supporting device 12 is preferably formed in two sections 12$^a$ and 12$^b$ held together as by the screws 13 and the lower section 12$^b$ is provided with a centrally disposed longitudinal groove in which slidably rests a member 14. The member 14 terminates in a curved end portion 15 which arches upwardly adjacent the end of the recess 11 as is best shown in Figure 3. The end of the celluloid strip 10 projecting from the recess 11 is coiled about a mandrel 16 extending transversely of the support 12 and substantially centrally disposed within the curved inner surface of the part 15 as will be described.

The mandrel 16 is provided with an enlarged end member 17 which is adapted to be gripped for turning the mandrel about its longitudinal axis and to this member 17 the end of the celluloid strip is connected as at 18. As the mandrel is now turned as by means of the part 17 in the direction indicated by the arrow in Figure 3, the celluloid strip is drawn through the supporting device 12 and coiled about the mandrel. The part 15 serves as a clamp to hold the coils of the celluloid cable as they are thus formed and aids in guiding the celluloid strip to insure even winding. Projecting from the end of the support 12 at the side of the opening from the recess 11 is a guiding member 19 which engages the side surface of the celluloid strip as it is drawn from the recess and directs it about the mandrel in the desired spiral direction underneath the clamp 15, as is best shown in Figure 1. The clamp 15 connected with the slidable member 14 is urged outwardly away from the mandrel preferably by means of a concealed spring 20 resting in a recess 21 in the member 12$^b$ and engaging a lug 22 projecting from the side of the part 14. The part 14 and therefore the clamp 15 are restrained from the outward movement under the urge of the spring 20 and are held in the position shown in the drawing by means of a spring latch 23 positioned on the lower surface of the member 12$^b$ as shown in Figure 3. The latch 23 engages a lug 24 extending downwardly from the member 14 through a slot 25 in the member 12$^b$. Therefore when the winding of the celluloid cable has been completed and it is desired to remove the same from within the clamp 15 a downward pressure at 26 upon the latch 23 releases the clamp 15 and permits it to move outwardly under the urge of the spring 20.

Considering now more particularly the cross-sectional shape of the celluloid strip 10, it is seen to be formed with a longitudinal groove 10$^a$ extending along one side thereof. Preferably the strip is first formed substantially circular in cross-section and the groove 10$^a$ is thereafter formed by removing a portion of the celluloid in any suitable manner. The groove 10$^a$ is curved in contour and preferably forms a convex surface having a curvature substantially similar to that of the remaining concave surface of the strip. Thus as the spiral cable or winding is formed therefrom the adjacent coils thereof interfit or overlap along this groove and since the abutting surfaces are shaped to mate, a highly compact and efficient winding is obtained. The passage or recess 11 in the supporting member 12 is preferably shaped to accommodate the cross-section of the strip and this is preferably brought about by the part 27 having a convex surface 27$^a$ shaped to mate with the groove in the celluloid strip and inserted in the side of the part 12$^a$ as shown in Figure 2. The guiding member 19 is of rounded cross-section shaped to fit the groove 10$^a$ and thus further serves to dependably guide the strip about the mandrel 16. The spiral celluloid winding or cable having thus been formed about the mandrel 16 the outer rounded surfaces of the coils are preferably removed as is shown in Figure 5 so that the outer surface 10$^b$ of the cable has a smooth even contour as shown at the left hand portion of this figure. It may be here noted, however, that this step of smoothing the outer surface of the cable may be performed at a later stage in the manufacture of the temple bar if so desired.

Referring now to Figure 4, there is shown a member 28 of celluloid which forms the main or body portion of the temple bar and which, it will be understood, extends forwardly and is mounted to the eyeglass rim or other lens mounting in the usual manner by means of a hinged connection. The member 10 may be formed in any desired manner and after forming is provided at its rear end with a longitudinal recess indicated generally at 29 and formed therein as by drilling for example. Within the recess 29 is fitted one end of a metallic member 30 extending rearwardly therefrom and thence curved to suitable contour to form the ear piece of the temple bar. The curved portion of the metallic extension 30 generally indicated at 30$^a$ is flexible being formed of a spirally wound wire member as indicated in the drawing. The portion of the member 30 within the recess 29 and extending rearwardly to a substantial distance from the end of the body member 28 as to a point 30$^c$, for example, is of relatively rigid construction to achieve advantages hereinafter set forth. The flexible portion 30$^a$ of the member 30 and the rigid portion 30$^b$ thereof may be formed from two separate members secured together as by soldering at the point 30$^c$. Preferably, however, the member 30 is formed from one continuous member of spirally wound wire and the rigid portion thereof is formed by soldering together the adjacent coils of that portion. The portion of the member 30 within the recess 29 is provided, adjacent its end, with projections preferably taking the form of a pair of flanges 31 formed thereon. These flanges 31 embedded in the non-metallic member 28 serve to provide a firm dependable connection between the extension 30 and the body member 28.

In joining the metallic extension 30 and the member 28 the recess 29 is preferably first formed as by drilling as has been mentioned above. The portion of the member 28 about the recess 29 may then be softened by suitable treatment and the member 30 having the flanges 31 formed thereon may then be forced into the recess and into place therein. The material of the member 28 is then pressed firmly in about the member 30 and a secure connection is obtained.

The metallic extension 30 is preferably of substantially the same diameter as the mandrel 16 upon which the spiral celluloid cable is formed as has been described. This spiral cable having been cut to the required length is now slipped over the end of the metallic extension or core 30 and up against the end 28$^a$ of the member 28, the celluloid cable thus forming a flexible covering about the member 30. The end of the winding 10 is then secured at 28$^a$ to the body member 28 by any suitable means as, for example, by cementing. The extreme end of the metallic extension 30 is preferably threaded and threaded thereon is a cap member 32 to which the rear end of the spiral winding is secured. The cap 32 thus forms a dependable anchorage for the end of the winding as well as a smooth rounded end for the ear piece of the temple bar. The rounded outer surfaces of the coils of the winding or cable are preferably removed so that the smooth even surface 10$^b$ thereof substantially registers with the surface of the member 20$^a$.

A temple bar formed and assembled as above described provides a construction embodying many practical and useful advantages. The construction is strong and durable, the parts being joined in a manner which insures dependability. The ear piece of the temple bar formed by the wound metal core and its spiral celluloid covering is readily flexed and thus conveniently adjustable and self-adjusting to the curvature of the back of the ear. Considering the temple bar as a whole, it will be seen that the spirally wound celluloid portion adjacent the end of the body member 28 is stiffened with respect to its remaining or end portion due to the relatively rigid core portion 30$^b$ therein, and thus an abrupt transition from the stiffness of the rigid main body portion 28 to the great flexibility of the end portion, as the junction of the spirally wound celluloid member with the main body portion 28, is avoided. Thus there is no objectionable weakness caused by a too sudden increase of flexibility at the junction of the spirally wound portion of the temple bar and the main body portion 28.

The celluloid winding about the core 30 being shaped in cross-section as above described is particularly advantageous. It provides a covering which is easily flexed with the flexible portion of the core and which has a very close winding and smooth outer surface. As the covering is flexed with the core, the adjacent coils slide along their interfitting curved surfaces substantially in the manner of a ball and socket. Thus as the covering is flexed there are no gaps between the adjacent coils for the admission of dirt or hair and the metallic core is at all times concealed. The art of making the temple bars is one which is conveniently carried on with simple and inexpensive apparatus.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. In apparatus for making eyeglass temple bars and the like, in combination, a mandrel adapted to be rotated to coil a celluloid strip thereon, and means adapted to support and guide said celluloid strip to said mandrel comprising a device having an elongated passage having a cross-section substantially that of said strip for receiving said strip and means adjacent an end of said passage for receiving said strip therefrom and for guiding said strip about said mandrel in a spiral.

2. In apparatus for making eyeglass temple bars and the like, in combination, a device having an elongated recess to receive a celluloid strip, a mandrel adjacent one end of said recess adapted to be rotated relative to said device for drawing said strip therefrom and coiling the same about said mandrel, and a clamp connected to said device and embracing said mandrel for guiding said strip and holding said coil as it is formed.

3. In apparatus for making eyeglass temple bars and the like, in combination, a support having an elongated recess to receive a celluloid strip, means adjacent one end of said recess adapted to draw said strip therefrom and coil the same, and a clamping device adjacent said end of said recess mounted on said support and movable toward and away therefrom for holding said coil as it is formed.

4. In apparatus for making eyeglass temple bars and the like, in combination, a support having an elongated recess for receiving a celluloid strip, means adjacent one end of said recess adapted to draw said strip therefrom and coil the same, a device mounted on said support adapted to clamp said coil and movable into and out of clamping position, a spring tending to move said device out of clamping position, and a latch mechanism restraining said spring.

5. In apparatus for making eyeglass temple bars and the like, in combination, a support having an elongated recess for receiving a celluloid strip, said strip having a longitudinal groove formed therein, a mandrel adjacent one end of said recess adapted to be rotated to coil said strip thereon, a member mounted on said support adjacent said end of said recess adapted to interfit with said longitudinal groove and shaped to guide said strip about said mandrel, and means for holding said coiled strip about said mandrel.

6. The herein described art of making eyeglass temple bars and the like, which consists in forming a celluloid strip having a longitudinally extending groove thereon and spirally winding said strip about a core member so that the adjacent coils interfit along said groove.

7. The herein described art of making eyeglass temple bars and the like, which consists in forming a celluloid strip of substantially circular cross section, removing a longitudinal portion of said strip to form therein a longitudinal groove of curved contour, and spirally winding said strip about a core member so that the grooved surface of each coil interfits with a rounded surface of an abutting coil.

8. The herein described art of making eyeglass temple bars and the like, which consists in forming a celluloid strip of substantially circular cross section, removing a longitudinal portion of said strip to form thereon a longitudinal groove of curved contour, winding said strip about a core member to form therefrom a spiral cable the adjacent coils of which interfit along said groove, and removing the rounded outer portion of said coils to give said cable a substantially smooth even surface.

9. The herein described art of making eyeglass temple bars and the like, which consists in forming a celluloid strip having a longitudinally extending groove therein, winding said strip about a mandrel to form therefrom a spiral cable the adjacent coils of which interfit along said groove, removing said cable from said mandrel, and securing said cable upon a metallic core member to form a covering therefor.

10. The herein described art of making eyeglass temple bars and the like, which consists in forming a celluloid strip having a longitudinally extending groove therein, winding said strip about a mandrel to form therefrom a spiral cable the adjacent coils of which interfit along said groove, forming a main temple bar member of celluloid, securing a metallic extension thereto, and securing said cable in place upon said metallic extension to form a covering therefor.

11. The herein described art of making eyeglass temple bars and the like, which consists in forming a celluloid strip having a longitudinally extending groove therein, winding said strip about a mandrel to form therefrom a spiral cable the adjacent coils of which interfit along said groove, removing the outer portion of said coils to give said cable a substantially smooth exterior surface, forming a main temple bar member of celluloid, securing a metallic extension thereto, and securing said cable in place upon said metallic extension to form a covering therefor.

12. In apparatus for making eyeglass temple bars and the like, in combination, a supporting member having extending longitudinally therethrough a passage for a celluloid strip, said passage having a cross-section substantially that of said strip, a mandrel having means for attaching thereto the end of said celluloid strip projecting from an end of said passage, said mandrel and said supporting member being relatively rotatable to draw said celluloid strip through said passage, and means upon said supporting member adjacent said end of said passage adapted upon relative rotation between said supporting member and said mandrel to guide said strip in a spiral about said mandrel and to urge the coils thereof into compact abutting relation as they are formed.

13. In apparatus for making eyeglass temple bars and the like, in combination, a supporting member having extending longitudinally therethrough a passage for a celluloid strip, said passage having a cross-section substantially that of said strip, a mandrel having means for attaching thereto the end of said celluloid strip projecting from an end of said passage, said mandrel and said supporting member being relatively rotatable to draw celluloid strip through said passage, means upon said supporting member adjacent said end of said passage adapted upon relative rotation between said supporting member and said mandrel to guide said strip in a spiral about said mandrel and to urge the coils thereof into compact abutting relation as they are formed, and means upon said supporting member adapted to embrace and hold in shape said spiral coil as it is formed upon said mandrel.

14. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said mandrel and said supporting member being relatively rotatable to draw said celluloid strip through said passage, and a guiding member projecting from said supporting member at one side of said end of said passage adapted to engage a side surface of said strip and shaped to curve around said mandrel, said guiding member being adapted upon relative rotation between said supporting member and said mandrel to guide said celluloid strip in a spiral about said mandrel to form thereon a spiral coil and to hold the coils closely together as they are formed.

15. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said mandrel and said supporting member being relatively rotatable to draw said celluloid strip through said passage, a guiding member projecting from said supporting member at one side of said end of said passage adapted to engage a side surface of said strip and shaped to curve around said mandrel, said guiding member being adapted upon relative rotation between said supporting member and said mandrel to guide said celluloid strip in a spiral about said mandrel to form thereon a spiral coil, and a second member projecting from said supporting member adapted to embrace said coil as it is formed and hold the coils inwardly against said mandrel.

16. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said supporting member and said mandrel being relatively rotatable, said strip being adapted upon relative rotation between said supporting member and said mandrel to be drawn thereby through said passage and wound upon said mandrel in a spiral coil, and a member embracing said mandrel adjacent said end of said passage in said supporting member, said member forming with the end of said supporting member a passage transverse to said first passage and adapted substantially to fit the exterior of said coil to support and guide said coil and mandrel during said rotation.

17. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said supporting member and said mandrel being relatively rotatable, said strip being adapted upon relative rotation between said supporting member and said mandrel to be drawn thereby through said passage and wound upon said mandrel in a spiral coil, a member embracing said mandrel adjacent said end of said passage in said supporting member, said member forming with the end of said supporting member a passage transverse to said first passage and adapted substantially to fit the exterior of said coil to support and guide said coil and mandrel during said rotation, and means for moving said last member away from the end of said supporting member to permit removal of said coil and mandrel therein.

18. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said supporting member and said mandrel being relatively rotatable, said strip being adapted upon relative rotation between said supporting member and said mandrel to be drawn thereby through said passage and wound upon said mandrel in a spiral coil, and a member embracing said mandrel adjacent said end of said passage in said supporting member, said member forming with the end of the said supporting member a passage transverse to said first passage and adapted substantially to fit the exterior of said coil to support and guide said coil and mandrel during said rotation, said last member comprising a part slidably mounted and movable toward and away from the end of said supporting member.

19. In apparatus for making eyeglass temple bars and the like, in combination, a supporting member having extending therethrough a passage adapted to support and guide a celluloid strip, a mandrel having means for attaching thereto the end of said celluloid strip projecting from an end of said passage, said supporting member and said mandrel being relatively rotatable and said strip being adapted upon relative rotation between said supporting member and said mandrel to be drawn thereby through said passage and wound upon said mandrel, and said supporting member having means extending along said passage therethrough adapted to interfit with said celluloid strip and hold the same against twisting as it passes therethrough.

20. In apparatus for making eyeglass temple bars and the like, in combination, a support having a passage therethrough for receiving a celluloid strip, said strip having a longitudinal groove formed therein, a mandrel having means for attaching thereto the end of said celluloid strip projecting from an end of said passage, said supporting member and said mandrel being relatively rotatable and said strip being adapted upon relative rotation between said supporting member and said mandrel to be drawn through said passage and wound upon said mandrel with said groove in predetermined position relative to said mandrel, said support having means coacting with said passage therein for interfitting with said groove to prevent said strip from twisting as it is drawn through said passage.

21. The herein described art of making eyeglass temple bars and the like, which consists in softening a celluloid strip, placing said softened strip in a support therefor, securing the end of said strip to a mandrel, rotating said mandrel thereby drawing said strip from said support and spirally coiling the same about said mandrel, and holding the adjacent coils in abutting relation as said spiral is formed.

22. The herein described art of making eyeglass temple bars and the like, which consists in softening a celluloid strip, placing said softened strip in a support therefor, securing the end of said strip to a mandrel, rotating said mandrel thereby drawing said strip from said support and spirally coiling the same about said mandrel, and holding said strip against twisting as it is drawn through said support.

23. The herein described art of making eyeglass temple bars and the like, which consists in softening a celluloid strip, placing said softened strip in a support therefor, securing the end of said strip to a mandrel, rotating said mandrel thereby drawing said strip from said support and spirally coiling the same about said mandrel, holding the adjacent coils in abutting relation as said spiral is formed, and supporting said spiral coil of softened celluloid as it is formed upon said mandrel.

24. The herein described art of making eyeglass temple bars and the like, which consists in softening a celluloid strip, placing said softened strip in a support therefor, securing the end of said strip to a mandrel, rotating said mandrel thereby drawing said strip from said support and spirally coiling the same about said mandrel, holding the adjacent coils in abutting relation as said spiral is formed, supporting said spiral coil of softened celluloid as it is formed upon said mandrel, and allowing said celluloid strip to harden in said spiral form upon said mandrel.

25. In apparatus for making eyeglass temple bars and the like, in combination, a support having a recess adapted to receive a strip of celluloid, means adjacent one end of said recess adapted to draw said strip therefrom and coil the same, and means adjacent said end of said recess for embracing and holding said coil as it is formed.

In testimony whereof, I have signed my name to this specification this tenth day of October, 1923.

STEPHEN J. CLULEE.